(12) United States Patent
Zheng et al.

(10) Patent No.: US 11,795,269 B2
(45) Date of Patent: Oct. 24, 2023

(54) COPOLYESTER AND USE THEREOF

(71) Applicant: FAR EASTERN NEW CENTURY CORPORATION, Taipei (TW)

(72) Inventors: Wei-Lin Zheng, Taipei (TW); Fa-Chen Chi, Taipei (TW); Shu-Wei Liu, Taipei (TW); Ruey-Fen Liao, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 95 days.

(21) Appl. No.: 17/562,943

(22) Filed: Dec. 27, 2021

(65) Prior Publication Data

US 2022/0227923 A1 Jul. 21, 2022

(30) Foreign Application Priority Data

Jan. 14, 2021 (TW) .................. 110101498

(51) Int. Cl.
*C08G 63/676* (2006.01)
*C08L 67/02* (2006.01)
*C08G 63/16* (2006.01)

(52) U.S. Cl.
CPC ........... *C08G 63/676* (2013.01); *C08G 63/16* (2013.01); *C08L 67/02* (2013.01); *C08L 2203/12* (2013.01)

(58) Field of Classification Search
CPC ..... C08G 63/676; C08G 63/18; C08G 63/199
See application file for complete search history.

(56) References Cited

U.S. PATENT DOCUMENTS

2018/0244878 A1* 8/2018 Inagaki ................. C08G 63/16
2019/0048133 A1 2/2019 Jang et al.

FOREIGN PATENT DOCUMENTS

| CN | 110628374 A | 12/2019 |
| JP | 2019-45623 A | 3/2019 |
| WO | WO 2015/108026 | * 7/2015 |

OTHER PUBLICATIONS

Translation of WO 2015/108026 (Year: 2015).*
English abstract translation of CN110628374A.
Office action and search report issued by the Taiwanese Intellectual Property Office (TIPO) dated Jan. 24, 2022 for the corresponding Taiwanese patent application 110101498.
English translation of the search report issued by the Taiwanese Intellectual Property Office (TIPO) dated Jan. 24, 2022 for the corresponding Taiwanese patent application 110101498.

* cited by examiner

*Primary Examiner* — Robert C Boyle
(74) *Attorney, Agent, or Firm* — WPAT LAW; Anthony King

(57) ABSTRACT

The present invention relates to a copolyester that includes following structural units:
a first chain segment shown in Formula (I):

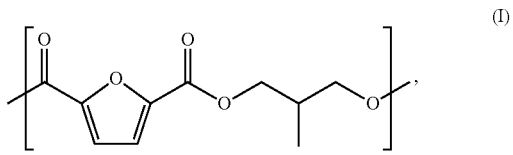

and
a second chain segment shown in Formula (II):

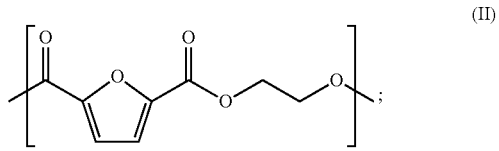

where the glass transition temperature (Tg) of the copolyester is 60° C. to 83° C. The present invention also provides a polyester fiber or packaging material containing the copolyester.

9 Claims, No Drawings

COPOLYESTER AND USE THEREOF

BACKGROUND OF THE INVENTION

1. Field of the Invention

The present invention relates to a copolyester and use thereof, in particular to a copolyester with a low softening point and having advantages of energy saving and carbon reduction, and to a polyester fiber or a packaging material prepared from the copolyester with a low softening point.

2. Description of the Related Art

Polyesters that are unmodified generally have the characteristic of high melting point. For example, polyethylene terephthalate (PET) has a melting point of about 260° C., and requires a relatively high processing temperature due to the high melting point, which limits the range of application. Therefore, in the industry polyesters are often modified to form copolyesters so as to lower the melting point. Copolyesters obtained after modification not only retain some properties of unmodified polyesters and thus have good compatibility with general polyester materials, but also have advantages such as a thermal bonding property. Such copolyesters are widely used in textiles, building materials, coatings and the like, especially in the field of non-woven textiles. The use of modified copolyesters in preparation of thermally bonded polyester fibers has been increasing. This is because copolyesters have the above-mentioned characteristic of low thermal bonding temperature and thus can undergo thermal bonding with other polyester fibers at a low processing temperature, which reduces energy consumption and eliminates the need for additional chemical adhesives, thus allowing for more environmentally friendly processing.

At present, such copolyesters with low thermal bonding temperatures are copolyesters with PET as a main body. Their softening point is about 150° C. or below. The modification method mainly involves adding a suitable diacid or diol as a modifier into the main structure of PET to form a copolyester. Commonly used diacid modifiers include isophthalic acid (IPA), 1,6-adipic acid (AA) and the like. Commonly used diol modifiers include 1,4-butanediol (1,4-BDO), 1,6-hexanediol (1,6-HD), diethylene glycol (DEG), neopentyl glycol (NPG), 2-methyl-1,3-propanediol (MPDO) and the like. The main function of a modifier is to reduce the original regularity of the main body of a molecular chain, thereby lowering the melting point in proportion to the amount of modifier added. In addition, with different types of modifiers, copolyesters may be modified into crystalline or noncrystalline copolyesters. It should be noted that if a thermal bonding effect has to be achieved, the melting point of a crystalline copolyester (namely, the temperature at which a crystalline form is changed into a molten fluid form) is used as a lower limit of a processing temperature; for a noncrystalline copolyester, the softening point thereof (the temperature at which a noncrystalline polyester is changed into a soft flowing form) is used as a lower limit of a processing temperature. Both the melting point and the softening point are reduced in proportion to the amount of modifier added, thereby reducing the thermal bonding processing temperature.

Currently, the industry is committed to development of copolyesters with lower softening points (lower than 130° C.), which can reduce thermal bonding processing temperature during operation for subsequent production of polyester fiber products, thereby reducing energy consumption. A conventional method includes adding one or more modifiers into a main body of PET for modification. For example, US Patent Publication US2019/0048133 discloses that 40 mol % MPDO is used to modify a main body of PET to form a noncrystalline copolyester, with a softening point of 128° C., and a glass transition temperature (Tg) of 67.6° C.

A greater amount of a modifier or more modifiers need to be added into a main body of PET to make the softening point of a copolyester lower than 120° C. For example, according to an example of US2019/0048133, two modifiers including 15 mol % DEG and 30 mol % IPA are added into a main body of PET to form a copolyester with a softening point of 115° C. and a glass transition temperature (Tg) of 63.5° C.

However, adding multiple modifiers would not only complicate the process, but also increase the risk of more side reactions. Furthermore, it can be seen from the examples of the above-mentioned patent application that the glass transition temperature of a copolyester having PET as the main body is decreased as the melting point or softening point thereof is lowered. The decrease in the glass transition temperature would affect the thermal stability of a subsequent processed product, make the product size unstable, and create stickiness problems for product transportation. Therefore, there is need in the industry to lower the softening point of a polyester by modification while maintaining Tg above a certain temperature (generally above 60° C.).

In addition to the specific needs of industrial applications, dwindling supply of petroleum, the environmental consequences of carbon emissions and the need for new renewable material supplies are important issues globally. For example, Japanese Patent Application 2019-45623 discloses a polyester-based carbon powder particle, in which the polyester is obtained by condensation of a biomass material 2,5-furandicarboxylic acid and a diol with a branched chain, where the polyester is an oligomer ($3,000 \leq Mn \leq 20,000$), with an acid value and a hydroxyl value needing to satisfy a certain relation. By adopting this carbon powder in electrophotographic printing, the impact on the environment can be reduced. Thus, the development of biomass-based materials with excellent performance to realize energy savings and carbon reduction is an issue to be continuously addressed in the industry.

SUMMARY OF THE INVENTION

This present application is a result of research and development to address the foregoing technical problems. One objective of the present invention is to provide a novel copolyester. The copolyester has a low softening point which can lower a thermal bonding processing operation temperature to reduce energy consumption, and also has a higher glass transition temperature Tg, which can improve the thermal stability of a subsequent finished product. Furthermore, polyethylene 2,5-furandicarboxylic acid (PEF) obtained by polymerization of biomass-derived 2,5-furandicarboxylic acid (FDCA) or a derivative thereof and ethylene glycol (EG) is used as a main structure of a polyester in the present invention. Since PEF is a biomass-based material, the copolyester of the present invention has the advantages of energy savings and carbon reduction.

Specifically, the copolyester of the present invention includes following structural units:

a first chain segment as shown in Formula (I):

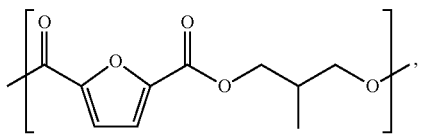

and a second chain segment as shown in Formula (II):

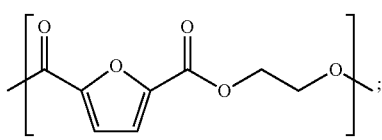

where the glass transition temperature (Tg) of the copolyester is 60° C. to 83° C.

Another objective of the present invention is to provide use of the copolyester in preparation of a polyester fiber or packaging material.

A further objective of the present invention is to provide a polyester fiber or packaging material containing the copolyester.

DETAILED DESCRIPTION

Each embodiment and each example of the present invention disclosed herein is intended to be individually combined with one or more of all other disclosed embodiments and examples of the present invention to form all possible combinations thereof.

In this specification and the claims, unless otherwise specified in the context, the singular forms "a," "an" and "the" include the plural. Unless otherwise claimed, any and all examples or illustrative language (for example, "such as") provided herein are only used to better illustrate the present invention, rather than limit the scope of the present invention. Language in the subject specification should not be interpreted as indicating that any unclaimed element is necessary for implementing the present invention.

The term "alcohol" as used herein refers to a molecule having at least one —OH group in the molecular structure. The term "polyol" or "polyol component" refers to a molecule containing two or more —OH groups in the structure. For convenience of expression, terms such as "diol (dihydric alcohol)" and "triol (trihydric alcohol)" are also used to specifically refer to the quantity of —OH groups contained in a molecule.

The term "polyacid" or "polyacid component" as used herein refers to a molecule having at least 2 —COOH groups in a molecular structure, or a molecule having a —COOH derived structure and being capable of producing at least 2 —COOH groups by hydrolysis and other means in the molecular structure. The derived structure includes, for example, esters, acid anhydrides or the like. For convenience of expression, terms such as "diacid (dibasic acid)" and "triacid (tribasic acid)" are also used to specifically refer to the quantity of —COOH groups contained in a molecule.

The content of the present invention is described in detail below:

As described above, PEF is used as a main structure of a polyester in the present application. As a currently developed biomass polyester material, PEF can be obtained by polymerization of 2,5-furandicarboxylic acid (FDCA) and ethylene glycol (EG). Although both PEF and PET are polycondensation polymers, the structural difference in diacid monomers (namely 2,5-furandicarboxylic acid (FDCA) and terephthalic acid (TPA)) of PEF and PET results in different reaction conditions and properties.

Specifically, since a five-ring structure of FDCA has an oxygen atom, compared with a benzene ring of TPA, FDCA has more polarity, is unstable and easily reacts with other molecules. Therefore, the two are not easily interchangeable in applications.

An embodiment of the present invention provides a copolyester, including the following structural units:

a first chain segment as shown in Formula (I):

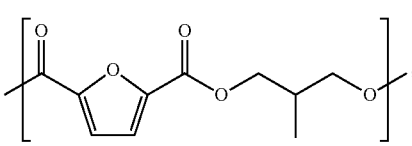

and a second chain segment as shown in Formula (II):

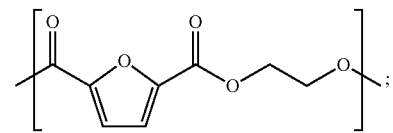

where the glass transition temperature (Tg) of the copolyester is 60° C. to 83° C.

According to some embodiments of the present invention, the softening point temperature of the copolyester is 90° C. to 190° C. In some examples, the softening point temperature of the copolyester is about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C. or about 190° C., or may be in a range of any two values above.

According to some embodiments of the present invention, the Tg of the copolyester is about 60° C., about 62° C., about 64° C., about 66° C., about 68° C., about 70° C., about 72° C., about 74° C., about 76° C. or about 78° C., or may be in a range of any two values above.

According to some embodiments of the present invention, based on total moles of the first chain segment and the second chain segment in the copolyester, the content of the first chain segment is 10-70 mol %. In some examples, based on total moles of the first chain segment and the second chain segment in the copolyester, the content of the first chain segment is 15-70 mol %, 18-65 mol % or 35-65 mol %.

According to some embodiments of the present invention, based on total moles of the first chain segment and the second chain segment in the copolyester, the molar ratio of the first chain segment to the second chain segment is about 10:90 to about 70:30. In some examples, the molar ratio of the first chain segment to the second chain segment is about 10:90, about 15:85, about 20:80, about 25:75, about 30:70, about 35:65, about 40:60, about 45:55, about 50:50, about 55:45, about 60:40, about 65:35 and about 70:30, or may be in a range of any two values above, such as, about 10:90 to about 65:35, about 20:80 to about 60:40 or about 25:75 to about 50:50 and the like.

According to some embodiments of the present invention, the copolyester is a noncrystalline copolyester with a softening point temperature of 90° C. to 150° C.

According to some embodiments of the present invention, the copolyester is formed by polymerization of a polyacid and a polyol. In some examples, the polyacid includes a diacid component, and the polyol includes a diol component. The diacid component includes 2,5-furandicarboxylic acid, a 2,5-furandicarboxylic acid derivative or a combination thereof, and the diol component includes ethylene glycol (EG) and 2-methyl-1,3-propanediol (MPDO).

According to some embodiments of the present invention, the diacid component is 2,5-furandicarboxylic acid, 2,5-furandicarboxylate or a combination thereof. In some examples, the 2,5-furandicarboxylate is dimethyl 2,5-furandicarboxylate.

The present invention also provides use of any one of the foregoing copolyesters in preparation of a polyester fiber or packaging material.

In another aspect, the present invention provides a polyester fiber containing any one of the foregoing copolyesters. The present invention also provides a packaging material containing any one of the foregoing copolyesters.

Upon research, the inventors of the present invention found that compared with conventional low-melting-point or low-softening-point polyesters with PET as a main body, in the present invention, by using PEF as a main body, only one modifier is needed to effectively achieve a softening point of lower than 120° C. or even lower than 100° C., while the copolyester still has a high Tg characteristic to improve the thermal stability.

Therefore, in subsequent preparation of polyester fibers and other applications, since the copolyester of the present invention has a low softening point, the processing temperature required for thermal bonding of the copolyester products can be lower, thereby reducing energy consumption. For thermal bonding applications of the subsequent copolyester products, features such as utilizability and processability are realized. Furthermore, since the copolyester of the present invention has a higher Tg, the subsequent copolyester products have high improved thermal stability, which avoids the problems of size changes or stickiness due to increased temperature.

In addition, the inventors of the present invention found through research that compared with conventional low-melting-point polyesters, the copolyester of the present invention has significantly high adhesion. When the copolyester of the present invention is applied to the textile field, a low-melting-point polyester fiber is prepared by a spinning process, which can be used as a thermal bonding fiber and bonded to a general polyester fiber (such as PET). Compared with other existing thermal bonding fibers, the polyester fiber of the present invention has higher adhesion and more advantages in subsequent fiber processing applications.

Furthermore, the copolyester of the present invention can be used in preparation of a packaging material. The packaging material is not particularly limited in type. For example, the packaging material may be a general food packaging material, a beverage packaging bottle, a printing packaging material, a heat-sealing film packaging material and other products. The packaging material prepared from the copolyester of the present invention can have good air barrier property, heat resistance, mechanical property and the like.

Examples of the present invention are described in detail below. The examples described herein are illustrative and diagrammatic examples to provide a basic understanding of the application. The examples of this application should not be construed as limitations of this application.

EXAMPLES

Example 1

355 g of dimethyl 2,5-furandicarboxylate (DMFD), a diol mixture containing 255 g of ethylene glycol (EG) and 40 g of 2-methyl-1,3-propanediol (MPDO), 0.1 g of zinc acetate hydrate ($Zn(OAc)_2$-$2H_2O$, as a transesterification catalyst), 0.08 g of antimony trioxide ($Sb_2O_3$, as a catalyst) and 0.31 g of stabilizer phosphoric acid were added to a 1 L polymerization reactor (AUTOCLAVE). Then, the transesterification reaction of the mixture was carried out at a temperature of 225±2° C. under normal pressure and nitrogen. Next, the reaction temperature and pressure were adjusted to 245±2° C. and less than 1 torr, respectively, after which a polycondensation reaction was carried out to form a copolyester.

Example 2

A copolyester of Example 2 was prepared by the same manufacturing method as Example 1 except that a diol mixture containing 225 g of EG and 80 g of MPDO was used.

Example 3

A copolyester of Example 3 was prepared by the same manufacturing method as Example 1 except that a diol mixture containing 170 g of EG and 165 g of MPDO was used.

Comparative Example 1 Synthesis of Low-Softening-Point PET Polyester 300 g of terephthalic acid (PTA), 94 g of ethylene glycol (EG), 78 g of 2-methyl-1,3-propanediol (MPDO), 0.11 g of antimony trioxide ($Sb_2O_3$) and 0.31 g of stabilizer phosphoric acid were added into a 1 L polymerization reactor (AUTOCLAVE). Then, the transesterification reaction of the mixture was carried out at a temperature of 260±2° C. under a nitrogen pressure of 2 kg/$cm^2$. Next, the reaction temperature and the pressure were adjusted to 278±2° C. and less than 1 torr, respectively, after which a polycondensation reaction was carried out to form a copolyester.

Property Test of Copolyester

1. Intrinsic Viscosity (IV):
Intrinsic viscosity of the copolyesters in examples and comparative example was measured by using an ASTM D4603-03 method.
2. Glass Transition Temperature (Tg) or Softening Point (Ts) of the Copolyester:

Tg: An analytical test was performed by differential scanning calorimetry (DSC Q2000, TA-Instruments) under nitrogen at a temperature rise and fall rate of 5° C./mm.

Ts: The softening point Ts of the copolyester was measured by using a dynamic mechanical analyzer (DMA-7, Perkin Elmer) in a TMA mode.

3. Structural Analysis of the Copolyester:

The obtained copolyester was dissolved in a solvent containing $CDCl_3$ and $CF_3COOH$ at a volume ratio of 3:1, a 1H-NMR spectrum was obtained by using a nuclear magnetic resonance spectrometer (NMR, Bruker), and a molar ratio of repeating units (abbreviated as "EG chain segment" and "MPDO chain segment"), as formed from EG and MPD, in the copolyester was analyzed and calculated.

Test results of each example and comparative example are shown in Table 1:

TABLE 1

Compositions and physical properties of copolyester

| | | Structure of copolyester | | | | |
|---|---|---|---|---|---|---|
| | Monomer | EG chain segment (mole %) | MPDO chain segment (mole %) | Intrinsic viscosity (dL/g) | Tg (° C.) | Ts (° C.) |
| Example 1 | DMFD, EG, MPDO | 82 | 18 | 0.649 | 76.9 | 146.5 |
| Example 2 | DMFD, EG, MPDO | 65 | 35 | 0.613 | 73.4 | 116.1 |
| Example 3 | DMFD, EG, MPDO | 35 | 65 | 0.639 | 63.8 | 92.8 |
| Comparative Example 1 | PTA, EG, MPDO | 57 | 43 | 0.609 | 61.8 | 112.9 |

It can be seen from Examples 1 to 3 in Table 1 that by adding different amounts of EG and MPDO, a molar ratio of the EG chain segment to the MPDO chain segment in the copolyester can be controlled. The effect of lowering the softening point can be effectively achieved by increasing the proportion of the MPDO chain segment.

Comparative Example 1 relates to a copolyester with PET as a main body, wherein the copolyester is a noncrystalline copolyester obtained by modification with 43 mol % MPDO chain segment. The Ts temperature thereof can be reduced to 112.9° C., but the Tg temperature is only 61.8° C. Comparison of Example 2 and Comparative Example 1 shows that Ts temperatures in these two examples are similar, but in Example 2, only 35 mol % MPDO chain segment is needed for modification, and Tg is about 12° C. higher than that in Comparative Example 1. From comparison of Example 3 and Comparative Example 1, it is found that the Ts (92.8° C.) in Example 3 is lower, but the Tg is still 63.8° C.

It can be seen from the above that the novel copolyester provided in this application not only has the characteristic of a low softening point, but also maintains a higher Tg, which may significantly increase the thermal stability of the copolyester.

Example 4 Adhesion Test of Copolyester

1. Preparation of a Copolyester Bonding Test Piece:

Copolyester granules in each of Examples 1 to 3 and Comparative Example 1 were placed in a stainless-steel flat mold. The sum of the softening point of the copolyester and 60° C. was used as a molding processing temperature. The test piece with a size of 13 cm*1.3 cm*0.1 cm was produced by using a compression molding machine and then cut into small test pieces with a size of 1 cm*0.65 cm*0.1 cm, and the small test pieces were used in an adhesion test.

2. Preparation of a PET Substrate Test Piece for Bonding:

A test piece having a thickness of 400 microns was prepared by commercially available PET ester granules (manufacturer: Far Eastern New Century, model: 600H) by using an extrusion molding method, and then cut into a sheet with an area of 5 cm*2 cm to serve as a substrate for bonding.

3. Thermal Bonding Processing of the Test Pieces.

Two PET substrate test pieces in step 2 were taken with an overlapping area of 2 cm*2 cm at their short sides. A copolyester bonding test piece was placed between the overlapping part of the two PET substrates and then heated for 5 minutes by using a setting dryer (Rapid R-3). The operation temperatures for bonding are listed in Table 2. After bonding, the sample was cooled at room temperature.

4. Adhesion Test:

A tensile testing machine (brand: PRO TEST, model: PT1066) and a 100 kg load cell (Load Cell) were used to test the foregoing sample after bonding at a pulling speed of 30 mm/min. When a tensile force was higher than a force that the sample could withstand, the two substrates would be separated at the bonded part. The tensile force (gf) during the separation was recorded, and results are listed in Table 2. It should be noted that the higher the maximum tensile force value is, the more difficult it is to separate the two PET substrate test pieces from the copolyester bonding test piece by using the tensile machine, i.e., the higher the adhesion between the copolyester and PET is. The copolyester would have good adhesion and compatibility with polyester fibers when applied to low-melting-point fibers. Such properties would be more beneficial to subsequent processing applications.

The test results are shown in Table 2:

TABLE 2

| | | Adhesion test | | | |
|---|---|---|---|---|---|
| Co-polyester | Ts (° C.) | 120° C. adhesion Maximum tensile force (gf) | 130° C. adhesion Maximum tensile force (gf) | 150° C. adhesion Maximum tensile force (gf) | 170° C. adhesion Maximum tensile force (gf) |
| Example 1 | 146.5 | 152 | 339 | 2407 | 8293 |
| Example 2 | 116.1 | 785 | 1673 | 4656 | 6471 |
| Example 3 | 92.8 | 1204 | 1790 | 5296 | 6488 |

TABLE 2-continued

Adhesion test

| Co-polyester | Ts (° C.) | 120° C. adhesion Maximum tensile force (gf) | 130° C. adhesion Maximum tensile force (gf) | 150° C. adhesion Maximum tensile force (gf) | 170° C. adhesion Maximum tensile force (gf) |
|---|---|---|---|---|---|
| Comparative Example 1 | 112.9 | 389 | 1189 | 3080 | 4872 |

Note: An adhesion effect is achieved only when the tensile force is higher than 700.

The experimental data of adhesion in Table 2 show that compared with Comparative Example 1 with PET as a main body, if noncrystalline copolyesters in Examples 1 to 3 are individually bonded at an appropriate temperature higher than Ts, they would have significantly better adhesion performance than Comparative Example 1. In addition, if the Ts of a copolyester is lower, it means that the copolyester can achieve good adhesion performance at a lower operating temperature. These data show that the copolyester of the present invention has the advantages such as utilizability and processability in low-melting-point polyester fibers and other related fields.

Although illustrative examples have been described, a person of ordinary skill in the technical field of the present invention should understand that the foregoing examples cannot be construed as limitations to the present application; changes, substitutions and modifications may be made to the examples without departing from the spirit, principle and scope of the application.

In addition, based on the foregoing descriptions, various modifications based on the present invention would be obvious to a person of ordinary skill in the technical field of the present invention. Such modifications also fall within the scope of the attached claims. Each reference cited in this application is incorporated herein by reference in entirety.

What is claimed is:

1. A polyester fiber comprising a copolyester, wherein the copolyester comprises the following structural units:

a first chain segment shown in Formula (I):

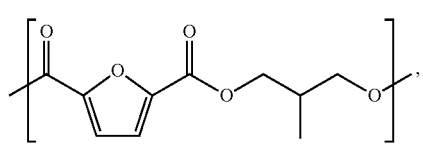

(I)

and a second chain segment shown in Formula (II):

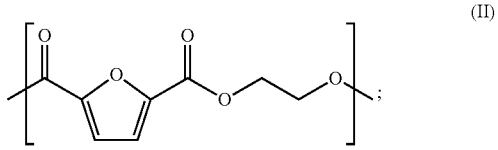

(II)

wherein the glass transition temperature (Tg) of the copolyester is 60° C. to 83° C.

2. The polyester fiber according to claim 1, wherein based on total moles of the first chain segment and the second chain segment in the copolyester, the content of the first chain segment is 10-70 mol %.

3. The polyester fiber according to claim 1, wherein based on total moles of the first chain segment and the second chain segment in the copolyester, the content of the first chain segment is 15-70 mol %.

4. The polyester fiber according to claim 1, wherein based on total moles of the first chain segment and the second chain segment in the copolyester, the content of the first chain segment is 18-65 mol %.

5. The polyester fiber according to claim 1, wherein based on total moles of the first chain segment and the second chain segment in the copolyester, the content of the first chain segment is 35-65 mol %.

6. The polyester fiber according to claim 1, wherein the copolyester has a softening point temperature of 90° C. to 150° C.

7. The polyester fiber according to claim 1, wherein the copolyester is obtained by polymerization of a diacid component and a polyol component, the diacid component comprises 2,5-furandicarboxylic acid, a 2,5-furandicarboxylic acid derivative or a combination thereof, and the polyol component comprises ethylene glycol and 2-methyl-1,3-propanediol.

8. The polyester fiber according to claim 7, wherein the diacid component is 2,5-furandicarboxylic acid, 2,5-furandicarboxylate or a combination thereof.

9. The polyester fiber according to claim 8, wherein the 2,5-furandicarboxylate is dimethyl 2,5-furandicarboxylate.

* * * * *